(12) United States Patent
Hammer et al.

(10) Patent No.: US 8,823,561 B1
(45) Date of Patent: Sep. 2, 2014

(54) IN-SYSTEM RECONFIGURABLE CIRCUIT FOR MAPPING DATA WORDS OF DIFFERENT LENGTHS

(75) Inventors: Michael Hammer, Westchester, IL (US); David Pierce, Wheaton, IL (US); Jin Zhang, Lake Zurich, IL (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 351 days.

(21) Appl. No.: 13/452,060

(22) Filed: Apr. 20, 2012

Related U.S. Application Data

(62) Division of application No. 12/494,822, filed on Jun. 30, 2009, now Pat. No. 8,165,164.

(51) Int. Cl.
*H03M 7/40* (2006.01)

(52) U.S. Cl.
USPC .................................. 341/67; 341/50; 341/51

(58) Field of Classification Search
CPC ................................ H04J 3/047; H04J 3/1605

USPC .............................................. 341/50, 51, 67
See application file for complete search history.

(56) References Cited

U.S. PATENT DOCUMENTS

| | | | |
|---|---|---|---|
| 6,295,595 B1 * | 9/2001 | Wildenberg et al. | 711/211 |
| 6,665,788 B1 * | 12/2003 | Hughes | 711/206 |
| 7,426,240 B2 * | 9/2008 | Peron | 375/260 |
| 2009/0046694 A1 * | 2/2009 | Matsumoto et al. | 370/343 |
| 2009/0241007 A1 * | 9/2009 | Hong et al. | 714/752 |
| 2010/0005356 A1 * | 1/2010 | Cho et al. | 714/749 |

\* cited by examiner

*Primary Examiner* — Jean B Jeanglaude

(57) ABSTRACT

A de-mapping circuit for de-mapping input words of a first length into output words of a second length different from the first length. In one embodiment, the circuit includes a word register of the first length and temporary registers of the second length. The word register successively stores each of the inputs words in response to cycles of a clock. The temporary registers temporarily store the output words. Multiplexers configured by address signals select bits from stored input words and store the selected bits into the temporary registers to form temporarily stored output words.

6 Claims, 8 Drawing Sheets

110

| | W1 | | | W2 | | | W3 | | | W4 | | |
|---|---|---|---|---|---|---|---|---|---|---|---|---|
| Y=0 | A0 | C0 | I0 | A0 | C0 | I'1 | A0 | C0 | I''2 | A0 | C0 | I'''3 |
| | A0 | C0 | Q0 | A0 | C0 | Q'1 | A0 | C0 | Q''2 | A0 | C0 | Q'''3 |
| | A0 | C0 | I1 | A0 | C0 | I'2 | A0 | C0 | I''3 | A0 | C0 | I'''4 |
| | A0 | C0 | Q1 | A0 | C0 | Q'2 | A0 | C0 | Q''3 | A0 | C0 | Q'''4 |
| | A0 | C0 | I2 | A0 | C0 | I'3 | A0 | C0 | I''4 | A0 | C0 | I'''5 |
| | A0 | C0 | Q2 | A0 | C0 | Q'3 | A0 | C0 | Q''4 | A0 | C0 | Q'''5 |
| | A0 | C0 | I3 | A0 | C0 | I'4 | A0 | C0 | I''5 | A0 | C0 | I'''6 |
| | A0 | C0 | Q3 | A0 | C0 | Q'4 | A0 | C0 | Q''5 | A0 | C0 | Q'''6 |
| | A0 | C0 | I4 | A0 | C0 | I'5 | A0 | C0 | I''6 | A0 | C0 | I'''7 |
| | A0 | C0 | Q4 | A0 | C0 | Q'5 | A0 | C0 | Q''6 | A0 | C0 | Q'''7 |
| | A0 | C0 | I5 | A0 | C0 | I'6 | A0 | C0 | I''7 | A0 | C0 | I'''8 |
| Y=1 | A0 | C0 | Q5 | A0 | C0 | Q'6 | A0 | C0 | Q''7 | A0 | C0 | Q'''8 |
| | A0 | C0 | I6 | A0 | C0 | I'7 | A0 | C0 | I''8 | A0 | C0 | I'''9 |
| | A0 | C0 | Q6 | A0 | C0 | Q'7 | A0 | C0 | Q''8 | A0 | C0 | Q'''9 |
| | A0 | C0 | I7 | A0 | C0 | I'8 | A0 | C0 | I''9 | A0 | C0 | I'''10 |
| | A0 | C0 | Q7 | A0 | C0 | Q'8 | A0 | C0 | Q''9 | A0 | C0 | Q'''10 |
| | A0 | C0 | I8 | A0 | C0 | I'9 | A0 | C0 | I''10 | A0 | C0 | I'''11 |
| | A0 | C0 | Q8 | A0 | C0 | Q'9 | A0 | C0 | Q''10 | A0 | C0 | Q'''11 |
| | A0 | C0 | I9 | A0 | C0 | I'10 | A0 | C0 | I''11 | A0 | C0 | I'''12 |
| Y=2 | A0 | C0 | Q9 | A0 | C0 | Q'10 | A0 | C0 | Q''11 | A0 | C0 | Q'''12 |
| | A0 | C0 | I10 | A0 | C0 | I'11 | A0 | C0 | I''12 | A0 | C0 | I'''13 |
| | A0 | C0 | Q10 | A0 | C0 | Q'11 | A0 | C0 | Q''12 | A0 | C0 | Q'''13 |
| | A0 | C0 | I11 | A0 | C0 | I'12 | A0 | C0 | I''13 | A0 | C0 | I'''14 |
| | A0 | C0 | Q11 | A0 | C0 | Q'12 | A0 | C0 | Q''13 | A0 | C0 | Q'''14 |
| | A0 | C0 | I12 | A0 | C0 | I'13 | A0 | C0 | I''14 | | | |
| | A0 | C0 | Q12 | A0 | C0 | Q'13 | A0 | C0 | Q''14 | | | |
| | A0 | C0 | I13 | A0 | C0 | I'14 | A0 | C0 | I'''0 | | | |
| Y=3 | A0 | C0 | Q13 | A0 | C0 | Q'14 | A0 | C0 | Q'''0 | | | |
| | A0 | C0 | I14 | A0 | C0 | I''0 | A0 | C0 | I'''1 | | | |
| | A0 | C0 | Q14 | A0 | C0 | Q''0 | A0 | C0 | Q'''1 | | | |
| | A0 | C0 | I'0 | A0 | C0 | I''1 | A0 | C0 | I'''2 | | | |
| | A0 | C0 | Q'0 | A0 | C0 | Q''1 | A0 | C0 | Q'''2 | | | |

100

| FIG. 1A | FIG. 1B | FIG. 1C | FIG. 1D |
|---|---|---|---|

|   | | W4 | | | W5 | | | W6 | | | W7 | | | W8 | | 100 |
|---|---|---|---|---|---|---|---|---|---|---|---|---|---|---|---|---|
| Y=0 | | | | | A0 | C1 | I4 | A0 | C1 | I'5 | A0 | C1 | I''6 | A0 | C1 | I'''7 |
| | | | | | A0 | C1 | Q4 | A0 | C1 | Q'5 | A0 | C1 | Q''6 | A0 | C1 | Q'''7 |
| | | | | | A0 | C1 | I5 | A0 | C1 | I'6 | A0 | C1 | I''7 | A0 | C1 | I'''8 |
| | | | | | A0 | C1 | Q5 | A0 | C1 | Q'6 | A0 | C1 | Q''7 | A0 | C1 | Q'''8 |
| | | | | | A0 | C1 | I6 | A0 | C1 | I'7 | A0 | C1 | I''8 | A0 | C1 | I'''9 |
| | | | | | A0 | C1 | Q6 | A0 | C1 | Q'7 | A0 | C1 | Q''8 | A0 | C1 | Q'''9 |
| | | | | | A0 | C1 | I7 | A0 | C1 | I'8 | A0 | C1 | I''9 | A0 | C1 | I'''10 |
| | | | | | A0 | C1 | Q7 | A0 | C1 | Q'8 | A0 | C1 | Q''9 | A0 | C1 | Q'''10 |
| | | | | | A0 | C1 | I8 | A0 | C1 | I'9 | A0 | C1 | I''10 | A0 | C1 | I'''11 |
| | | | | | A0 | C1 | Q8 | A0 | C1 | Q'9 | A0 | C1 | Q''10 | A0 | C1 | Q'''11 |
| | | | | | A0 | C1 | I9 | A0 | C1 | I'10 | A0 | C1 | I''11 | A0 | C1 | I'''12 |
| Y=1 | | | | | A0 | C1 | Q9 | A0 | C1 | Q'10 | A0 | C1 | Q''11 | A0 | C1 | Q'''12 |
| | | | | | A0 | C1 | I10 | A0 | C1 | I'11 | A0 | C1 | I''12 | A0 | C1 | I'''13 |
| | | | | | A0 | C1 | Q10 | A0 | C1 | Q'11 | A0 | C1 | Q''12 | A0 | C1 | Q'''13 |
| | | | | | A0 | C1 | I11 | A0 | C1 | I'12 | A0 | C1 | I''13 | A0 | C1 | I'''14 |
| | | | | | A0 | C1 | Q11 | A0 | C1 | Q'12 | A0 | C1 | Q''13 | A0 | C1 | Q'''14 |
| | | | | | A0 | C1 | I12 | A0 | C1 | I'13 | A0 | C1 | I''14 | | | |
| | | | | | A0 | C1 | Q12 | A0 | C1 | Q'13 | A0 | C1 | Q''14 | | | |
| | | | | | A0 | C1 | I13 | A0 | C1 | I'14 | A0 | C1 | I''0 | | | |
| Y=2 | | | | | A0 | C1 | Q13 | A0 | C1 | Q'14 | A0 | C1 | Q''0 | | | |
| | | | | | A0 | C1 | I14 | A0 | C1 | I'0 | A0 | C1 | I''1 | | | |
| | | | | | A0 | C1 | Q14 | A0 | C1 | Q'0 | A0 | C1 | Q''1 | | | |
| | | | | | A0 | C1 | I'0 | A0 | C1 | I'1 | A0 | C1 | I''2 | | | |
| | | | | | A0 | C1 | Q'0 | A0 | C1 | Q''1 | A0 | C1 | Q'''2 | | | |
| | | A0 | C1 | I0 | A0 | C1 | I'1 | A0 | C1 | I''2 | A0 | C1 | I'''3 | | | |
| | | A0 | C1 | Q0 | A0 | C1 | Q'1 | A0 | C1 | Q''2 | A0 | C1 | Q'''3 | | | |
| | | A0 | C1 | I1 | A0 | C1 | I'2 | A0 | C1 | I''3 | A0 | C1 | I'''4 | | | |
| Y=3 | | A0 | C1 | Q1 | A0 | C1 | Q'2 | A0 | C1 | Q''3 | A0 | C1 | Q'''4 | | | |
| | | A0 | C1 | I2 | A0 | C1 | I'3 | A0 | C1 | I''4 | A0 | C1 | I'''5 | | | |
| | | A0 | C1 | Q2 | A0 | C1 | Q'3 | A0 | C1 | Q''4 | A0 | C1 | Q'''5 | | | |
| | | A0 | C1 | I3 | A0 | C1 | I'4 | A0 | C1 | I''5 | A0 | C1 | I'''6 | | | |
| | | A0 | C1 | Q3 | A0 | C1 | Q'4 | A0 | C1 | Q''5 | A0 | C1 | Q'''6 | | | |

FIG. 1B

|   | W8 | | | W9 | | | W10 | | | W11 | | | W12 | | |
|---|---|---|---|---|---|---|---|---|---|---|---|---|---|---|---|
| Y=0 | | | | A1 | C0 | I8 | A1 | C0 | I'9 | A1 | C0 | I"10 | A1 | C0 | I'''11 |
| | | | | A1 | C0 | Q8 | A1 | C0 | Q'9 | A1 | C0 | Q"10 | A1 | C0 | Q'''11 |
| | | | | A1 | C0 | I9 | A1 | C0 | I'10 | A1 | C0 | I"11 | A1 | C0 | I'''12 |
| | | | | A1 | C0 | Q9 | A1 | C0 | Q'10 | A1 | C0 | Q"11 | A1 | C0 | Q'''12 |
| | | | | A1 | C0 | I10 | A1 | C0 | I'11 | A1 | C0 | I"12 | A1 | C0 | I'''13 |
| | | | | A1 | C0 | Q10 | A1 | C0 | Q'11 | A1 | C0 | Q"12 | A1 | C0 | Q'''13 |
| | | | | A1 | C0 | I11 | A1 | C0 | I'12 | A1 | C0 | I"13 | A1 | C0 | I'''14 |
| | | | | A1 | C0 | Q11 | A1 | C0 | Q'12 | A1 | C0 | Q"13 | A1 | C0 | Q'''14 |
| | | | | A1 | C0 | I12 | A1 | C0 | I'13 | A1 | C0 | I"14 | | | |
| | | | | A1 | C0 | Q12 | A1 | C0 | Q'13 | A1 | C0 | Q"14 | | | |
| | | | | A1 | C0 | I13 | A1 | C0 | I'14 | A1 | C0 | I"0 | | | |
| Y=1 | | | | A1 | C0 | Q13 | A1 | C0 | Q'14 | A1 | C0 | Q"0 | | | |
| | | | | A1 | C0 | I14 | A1 | C0 | I'0 | A1 | C0 | I"1 | | | |
| | | | | A1 | C0 | Q14 | A1 | C0 | Q'0 | A1 | C0 | Q"1 | | | |
| | | | | A1 | C0 | I'0 | A1 | C0 | I"1 | A1 | C0 | I'''2 | | | |
| | | | | A1 | C0 | Q'0 | A1 | C0 | Q"1 | A1 | C0 | Q'''2 | | | |
| | A1 | C0 | I0 | A1 | C0 | I'1 | A1 | C0 | I"2 | A1 | C0 | I'''3 | | | |
| | A1 | C0 | Q0 | A1 | C0 | Q'1 | A1 | C0 | Q"2 | A1 | C0 | Q'''3 | | | |
| | A1 | C0 | I1 | A1 | C0 | I'2 | A1 | C0 | I"3 | A1 | C0 | I'''4 | | | |
| Y=2 | A1 | C0 | Q1 | A1 | C0 | Q'2 | A1 | C0 | Q"3 | A1 | C0 | Q'''4 | | | |
| | A1 | C0 | I2 | A1 | C0 | I'3 | A1 | C0 | I"4 | A1 | C0 | I'''5 | | | |
| | A1 | C0 | Q2 | A1 | C0 | Q'3 | A1 | C0 | Q"4 | A1 | C0 | Q'''5 | | | |
| | A1 | C0 | I3 | A1 | C0 | I'4 | A1 | C0 | I"5 | A1 | C0 | I'''6 | | | |
| | A1 | C0 | Q3 | A1 | C0 | Q'4 | A1 | C0 | Q"5 | A1 | C0 | Q'''6 | | | |
| | A1 | C0 | I4 | A1 | C0 | I'5 | A1 | C0 | I"6 | A1 | C0 | I'''7 | | | |
| | A1 | C0 | Q4 | A1 | C0 | Q'5 | A1 | C0 | Q"6 | A1 | C0 | Q'''7 | | | |
| | A1 | C0 | I5 | A1 | C0 | I'6 | A1 | C0 | I"7 | A1 | C0 | I'''8 | | | |
| Y=3 | A1 | C0 | Q5 | A1 | C0 | Q'6 | A1 | C0 | Q"7 | A1 | C0 | Q'''8 | | | |
| | A1 | C0 | I6 | A1 | C0 | I'7 | A1 | C0 | I"8 | A1 | C0 | I'''9 | | | |
| | A1 | C0 | Q6 | A1 | C0 | Q'7 | A1 | C0 | Q"8 | A1 | C0 | Q'''9 | | | |
| | A1 | C0 | I7 | A1 | C0 | I'8 | A1 | C0 | I"9 | A1 | C0 | I'''10 | | | |
| | A1 | C0 | Q7 | A1 | C0 | Q'8 | A1 | C0 | Q"9 | A1 | C0 | Q'''10 | | | |

FIG. 1C

|   | W12 | | | W13 | | | W14 | | | W15 | | |
|---|---|---|---|---|---|---|---|---|---|---|---|---|
| Y=0 | | | | A1 | C1 | I12 | A1 | C1 | I'13 | A1 | C1 | I''14 |
|  | | | | A1 | C1 | Q12 | A1 | C1 | Q'13 | A1 | C1 | Q''14 |
|  | | | | A1 | C1 | I13 | A1 | C1 | I'14 | A1 | C1 | I'''0 |
|  | | | | A1 | C1 | Q13 | A1 | C1 | Q'14 | A1 | C1 | Q'''0 |
|  | | | | A1 | C1 | I14 | A1 | C1 | I''0 | A1 | C1 | I'''1 |
|  | | | | A1 | C1 | Q14 | A1 | C1 | Q''0 | A1 | C1 | Q'''1 |
|  | | | | A1 | C1 | I'0 | A1 | C1 | I''1 | A1 | C1 | I'''2 |
|  | | | | A1 | C1 | Q'0 | A1 | C1 | Q''1 | A1 | C1 | Q'''2 |
|  | A1 | C1 | I0 | A1 | C1 | I'0 | A1 | C1 | I''2 | A1 | C1 | I'''3 |
|  | A1 | C1 | Q0 | A1 | C1 | Q'0 | A1 | C1 | Q''2 | A1 | C1 | Q'''3 |
|  | A1 | C1 | I1 | A1 | C1 | I'2 | A1 | C1 | I''3 | A1 | C1 | I'''4 |
| Y=1 | A1 | C1 | Q1 | A1 | C1 | Q'2 | A1 | C1 | Q''3 | A1 | C1 | Q'''4 |
|  | A1 | C1 | I2 | A1 | C1 | I'3 | A1 | C1 | I''4 | A1 | C1 | I'''5 |
|  | A1 | C1 | Q2 | A1 | C1 | Q'3 | A1 | C1 | Q''4 | A1 | C1 | Q'''5 |
|  | A1 | C1 | I3 | A1 | C1 | I'4 | A1 | C1 | I''5 | A1 | C1 | I'''6 |
|  | A1 | C1 | Q3 | A1 | C1 | Q'4 | A1 | C1 | Q''5 | A1 | C1 | Q'''6 |
|  | A1 | C1 | I4 | A1 | C1 | I'5 | A1 | C1 | I''6 | A1 | C1 | I'''7 |
|  | A1 | C1 | Q4 | A1 | C1 | Q'5 | A1 | C1 | Q''6 | A1 | C1 | Q'''7 |
|  | A1 | C1 | I5 | A1 | C1 | I'6 | A1 | C1 | I''7 | A1 | C1 | I'''8 |
| Y=2 | A1 | C1 | Q5 | A1 | C1 | Q'6 | A1 | C1 | Q''7 | A1 | C1 | Q'''8 |
|  | A1 | C1 | I6 | A1 | C1 | I'7 | A1 | C1 | I''8 | A1 | C1 | I'''9 |
|  | A1 | C1 | Q6 | A1 | C1 | Q'7 | A1 | C1 | Q''8 | A1 | C1 | Q'''9 |
|  | A1 | C1 | I7 | A1 | C1 | I'8 | A1 | C1 | I''9 | A1 | C1 | I'''10 |
|  | A1 | C1 | Q7 | A1 | C1 | Q'8 | A1 | C1 | Q''9 | A1 | C1 | Q'''10 |
|  | A1 | C1 | I8 | A1 | C1 | I'9 | A1 | C1 | I''10 | A1 | C1 | I'''11 |
|  | A1 | C1 | Q8 | A1 | C1 | Q'9 | A1 | C1 | Q''10 | A1 | C1 | Q'''11 |
|  | A1 | C1 | I9 | A1 | C1 | I'10 | A1 | C1 | I''11 | A1 | C1 | I'''12 |
| Y=3 | A1 | C1 | Q9 | A1 | C1 | Q'10 | A1 | C1 | Q''11 | A1 | C1 | Q'''12 |
|  | A1 | C1 | I10 | A1 | C1 | I'11 | A1 | C1 | I''12 | A1 | C1 | I'''13 |
|  | A1 | C1 | Q10 | A1 | C1 | Q'11 | A1 | C1 | Q''12 | A1 | C1 | Q'''13 |
|  | A1 | C1 | I11 | A1 | C1 | I'12 | A1 | C1 | I''13 | A1 | C1 | I'''14 |
|  | A1 | C1 | Q11 | A1 | C1 | Q'12 | A1 | C1 | Q''13 | A1 | C1 | Q'''14 |

| | FIG. 3A | FIG. 3B |
|---|---|---|

| | W1 | | | W2 | | | W3 | | | W4 | | | W5 | | | W6 | | | W7 | | | W8 | | |
|---|---|---|---|---|---|---|---|---|---|---|---|---|---|---|---|---|---|---|---|---|---|---|---|---|
| Y=0 | A0 | C0 | I0 | A0 | C0 | I8 | A0 | C0 | I"1 | A0 | C0 | I'9 | A0 | C0 | I"2 | A0 | C0 | I"10 | A0 | C0 | I"'3 | A0 | C1 | I"'11 |
| | A0 | C0 | Q0 | A0 | C0 | Q8 | A0 | C0 | Q'1 | A0 | C0 | Q'9 | A0 | C0 | Q"2 | A0 | C0 | Q"10 | A0 | C0 | Q"'3 | A0 | C1 | Q"'11 |
| | A0 | C0 | I1 | A0 | C0 | I9 | A0 | C0 | I'2 | A0 | C0 | I'10 | A0 | C0 | I"3 | A0 | C0 | I"11 | A0 | C0 | I"'4 | A0 | C1 | I"'12 |
| | A0 | C0 | Q1 | A0 | C0 | Q9 | A0 | C0 | Q'2 | A0 | C0 | Q'10 | A0 | C0 | Q"3 | A0 | C0 | Q"11 | A0 | C0 | Q"'4 | A0 | C1 | Q"'12 |
| | A0 | C0 | I2 | A0 | C0 | I10 | A0 | C0 | I'3 | A0 | C0 | I'11 | A0 | C0 | I"4 | A0 | C0 | I"12 | A0 | C0 | I"'5 | A0 | C1 | I"'13 |
| | A0 | C0 | Q2 | A0 | C0 | Q10 | A0 | C0 | Q'3 | A0 | C0 | Q'11 | A0 | C0 | Q"4 | A0 | C0 | Q"12 | A0 | C0 | Q"'5 | A1 | C1 | Q"'13 |
| | A0 | C0 | I3 | A0 | C0 | I11 | A0 | C0 | I'4 | A0 | C0 | I'12 | A0 | C0 | I"5 | A0 | C0 | I"13 | A0 | C0 | I"'6 | A2 | C2 | I"'14 |
| | A0 | C0 | Q3 | A0 | C0 | Q11 | A0 | C0 | Q'4 | A0 | C0 | Q'12 | A0 | C0 | Q"5 | A0 | C0 | Q"13 | A0 | C0 | Q"'6 | A3 | C3 | Q"'14 |
| | A0 | C0 | I4 | A0 | C0 | I12 | A0 | C0 | I'5 | A0 | C0 | I'13 | A0 | C0 | I"6 | A0 | C0 | I"14 | A0 | C0 | I"'7 | A4 | C4 | |
| | A0 | C0 | Q4 | A0 | C0 | Q12 | A0 | C0 | Q'5 | A0 | C0 | Q'13 | A0 | C0 | Q"6 | A0 | C0 | Q"14 | A0 | C0 | Q"'7 | A5 | C5 | |
| | A0 | C0 | I5 | A0 | C0 | I13 | A0 | C0 | I'6 | A0 | C0 | I'14 | A0 | C0 | I"7 | A0 | C0 | I"'0 | A0 | C0 | I"'8 | | | |
| | A0 | C0 | Q5 | A0 | C0 | Q13 | A0 | C0 | Q'6 | A0 | C0 | I"'0 | A0 | C0 | Q"7 | A0 | C0 | Q"'0 | A0 | C0 | Q"'8 | | | |
| | A0 | C0 | I6 | A0 | C0 | I14 | A0 | C0 | I'7 | A0 | C0 | Q"'0 | A0 | C0 | I"8 | A0 | C0 | I"'1 | A0 | C0 | I"'9 | | | |
| Y=1 | A0 | C0 | Q6 | A0 | C0 | Q14 | A0 | C0 | Q'7 | A0 | C0 | I"'1 | A0 | C0 | Q"8 | A0 | C0 | Q"'1 | A0 | C0 | Q"'9 | | | |
| | A0 | C0 | I7 | A0 | C0 | I'0 | A0 | C0 | I'8 | A0 | C0 | Q"'1 | A0 | C0 | I"9 | A0 | C0 | I"'2 | A0 | C0 | I"'10 | | | |
| | A0 | C0 | Q7 | A0 | C0 | Q'0 | A0 | C0 | Q'8 | A0 | C0 | Q"'1 | A0 | C0 | Q"9 | A0 | C0 | Q"'2 | A0 | C0 | Q"'10 | | | |

FIG. 3B

IN-SYSTEM RECONFIGURABLE CIRCUIT FOR MAPPING DATA WORDS OF DIFFERENT LENGTHS

RELATED APPLICATION DATA

This application is a division of U.S. application Ser. No. 12/494,822, filed Apr. 24, 2012, now U.S. Pat. No. 8,165,164, which is incorporated herein by reference in its entirety.

TECHNICAL FIELD

The present invention relates generally to data mapping, and more particularly to a circuit for mapping data words into standardized data frames and for de-mapping the standardized data frames into the data words, wherein the circuit is in-system reconfigurable with regard to the mapping and de-mapping.

BACKGROUND

Cellular telephony systems provide coverage across broad areas using cells, where each cell is serviced by a corresponding cellular base station. A conventional base station is located adjacent the bank of antennas and amplifiers the base station uses to service its cell. As cellular providers support increasingly sophisticated services such as 3G (the third generation of standards for mobile networking), the real estate demands for the base stations necessary to support each cell in a cellular network increase. The costs for the space necessary to store the base station as well as the manufacturing costs for the base station itself motivated a cellular telephony consortium to develop a standardized interface denoted as the Common Public Radio Interface (CPRI). In a CPRI system, the base stations, which comprise part of what is referred to as Radio Equipment Control in a CPRI system, are located remotely from the cellular amplifiers and antennas; the amplifiers and antennas being part of what is denoted as Radio Equipment in a CPRI system. CPRI thus enables a distributed architecture in which the Radio Equipment Control (REC) base station functionality is coupled to corresponding Radio Equipment (RE) through fiber optic or wired links. In this fashion, a CPRI base station need not be located in a costly (and environmentally challenging) location such as urban rooftops or adjacent power station towers that hold the CPRI RE (also denoted as the Radio Head). In addition, the standardized nature of CPRI offers inherent cost savings to cellular providers as equipment providers must directly compete with each other because they offer the same standardized equipment. As a result, cellular telephony systems organized according to the CPRI protocol are growing in popularity.

In the CPRI standard, user data from the Radio Head is mapped into CPRI basic frames according to Antenna-Carrier (AXC) groups, where each AC group corresponds to one carrier at each independent antenna element. The CPRI standard defines a standard interface between the RE and the REC such that the in-phase (I) and quadrature phase (Q) digital samples that comprise the user data from the RE/radio head are mapped into CPRI basic frames according to this CPRI interface. While the structure of the CPRI basic frame is defined by the CPRI standard, the mapping of the IQ user data into AXC groups (also denoted as AC containers) within the CPRI basic frame is left as an implementation detail to the individual user. This mapping will depend on variables such as the sample width (number of bits) for the IQ data words, the AXC bandwidth, and the CPRI line rate (in Mbps). In that regard, specific mappings have been developed for the various wireless services such as Worldwide Interoperability for Microwave Access (WiMAX), Wideband Code Division Multiple Access (WCDMA), Long Term Evolution (LTE), and the like. But each service will typically need a unique mapping. For example, LTE specifies IQ sample widths of 4 to 20 bits in the uplink direction and 8 to 20 bits in the downlink direction.

Accordingly, there is a need in the art for a flexible mapping implementation to map IQ user data into standardized frames.

SUMMARY

In accordance with an embodiment of the invention, a de-mapping circuit for the de-mapping of input words of a first length is provided, wherein the de-mapping forms de-mapped output words of a second length different from the first length. The de-mapping circuit includes: a word register for successively storing each of the inputs words responsive to cycles of a clock such that for a given cycle of the clock, the word register stores a first input word for a given frame, and such that at each of corresponding successive cycles of the clock subsequent to the given cycle, the word register registers a corresponding successive input word for the given frame until a final word for the given frame is registered; a plurality of temporary registers for storing temporary words; a plurality of sets of first multiplexers corresponding to the plurality of temporary registers, wherein each first multiplexer is configured to select bits from the word register, each first multiplexer corresponding uniquely to a bit position in the temporary words such that each bit in the temporary words is selected by the corresponding first multiplexer, wherein the selection by the first multiplexers is configured by address signals; a sample register for storing the de-mapped output word; and a second multiplexer for selecting from the temporary words to provide the de-mapped output words to the sample register, wherein the selection by the second multiplexer is also configured by address signals; and a memory for storing the address signals.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 illustrates an example CPRI basic frame IQ data block structure.

FIG. 3. illustrates another example CPRI basic frame IQ data block structure.

Embodiments of the present invention and their advantages are best understood by referring to the detailed description that follows. It should be appreciated that like reference numerals are used to identify like elements illustrated in one or more of the figures.

DETAILED DESCRIPTION

Figure 2:
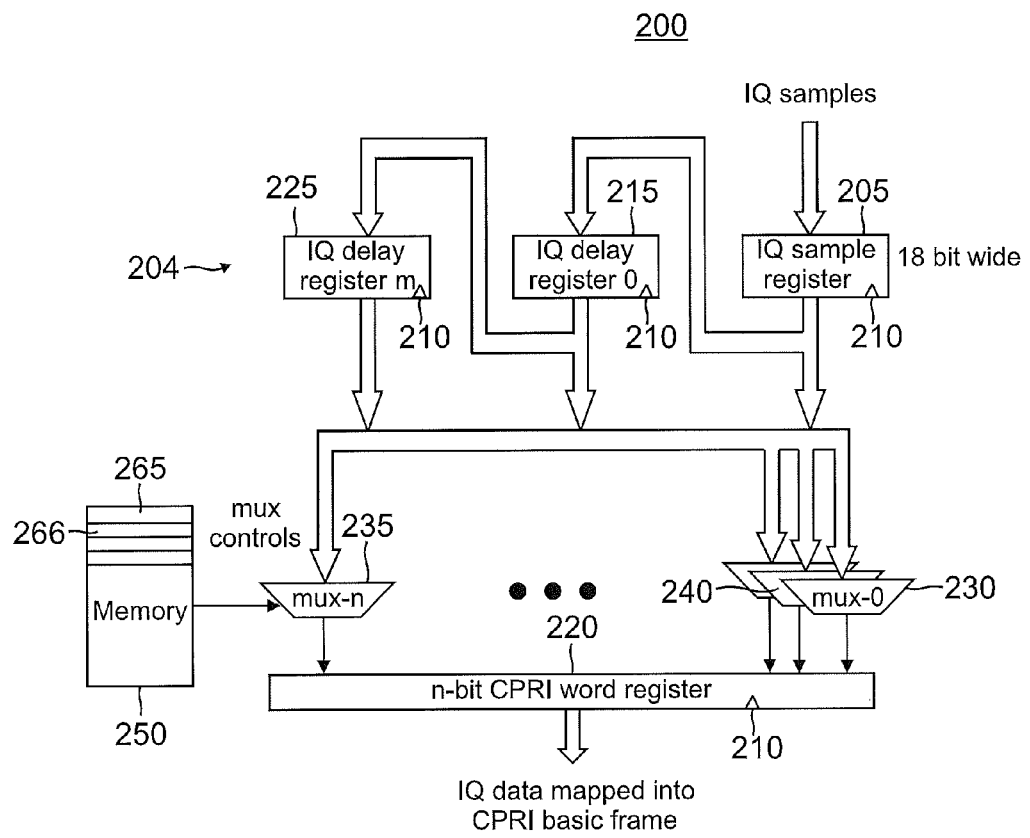
FIG. 2 illustrates a mapping circuit configured to map IQ data into a CPRI basic frame according to an embodiment of the invention.

An in-system reconfigurable general purpose mapping and de-mapping fabric is provided that supports complete mapping/de-mapping flexibility with respect to data words of a first length and data words of second length arranged into frames. The following discussion will assume that the frames are CPRI basic frames and the data words of the first length are IQ user plane data but it will be appreciated that this in-system reconfigurable fabric may be readily adapted to other mapping protocols besides that practiced in CPRI systems. This fabric may be implemented in a general purpose programmable logic device such as a field programmable gate array (FPGA) but it will be appreciated that a dedicated circuit such as an application specific integrated circuit may also be used to implement this mapping/de-mapping fabric. Moreover, this mapping/de-mapping fabric could also be implemented using discrete circuits as opposed to an integrated circuit implementation. Thus, it will be appreciated that the mapping/de-mapping fabric may be implemented in many different forms. A better appreciation of the versatility and advantages of this fabric may be gained through an examination of CPRI basic frame architecture.

A CPRI basic frame includes 16 words with an index W ranging from zero to fifteen. The beginning word in the frame (W=0) is a control word followed by fifteen data words (W=1 to 14). A line rate for the frame determines a bit length T of each CPRI basic frame word. The minimum length of T is a byte (eight bits) and can be increased in multiples of bytes. Thus, if T=8, each CPRI basic frame word is eight bits long whereas if T=16, each CPRI basic frame word is sixteen bits long. An index B is used to designate each bit within a CPRI basic frame word, ranging from B=0 for the least significant bit (LSB) to B=(T−1) for the most significant bit (MSB). As opposed to the bits, each byte within a CPRI basic frame word is designated with an index Y. Turning now to the drawings, FIG. 1 illustrates CPRI basic frame words for a 2.4 GHz line rate (32 bit CPRI word length) accommodating four antenna carrier groups (ACs) as derived from two antennas (A0 and A1) and two carriers (C0 and C1) for the LTE communication protocol. Thus, the four antenna carrier groups are designated as (A0 C0), (A0 C1), (A1 C0), and (A1 C1). For illustration clarity, each of these figures shows only one of the ACs. The control word is not illustrated such that the index W for the words ranges from W1 to W15. The fifteen CPRI basic frame words W1 to W15 are known as an IQ data block 100. IQ data block 100 would comprise a CPRI basic frame if the control word W0 was also included. Each CPRI basic frame word occupies its own column in these figures and is four bytes long such that the byte index Y ranges from 0 to 3 for each column.

The manner in which IQ samples, which may also be designated as user input data words, are mapped into a CPRI basic frame/IQ data block depends upon the communication protocol. In the example mapping for FIG. 1, each received IQ sample is 30 bits long (15 bits each for the I and Q channels ranging from a zeroth to a fourteenth bit for each I and Q channel). Each antenna carrier group in IQ data block 100 includes 4 IQ samples (corresponding to an antenna carrier group bandwidth of 10 MHz) indexed as I, I', I", and I''' for the corresponding I channels and Q, Q', Q", Q''' for the corresponding Q channels. A first antenna carrier group 110 for antenna A0 and carrier C0 begins in a CPRI word W1 as I0, Q0, I1, . . . Q14 for the first IQ sample. There are only 30 bits in each IQ sample whereas each CPRI frame word is 32 bits for this particular mapping so any mapping circuit for mapping into IQ data block 100 would have to store this initial IQ sample until the subsequent I'Q' sample is received to complete CPRI basic frame word W1. The zeroth I and Q channel bits for this subsequent I'Q' sample form the final two bits for word W1.

A mapping of the I'Q' sample into IQ data block 100 would thus continue into basic frame word W2, ranging from bit I'1 to Q'14. But this mapping will leave four bits unfilled in word W2 so a mapping circuit performing this mapping will store sample I'Q' until the subsequent sample I"Q" is received to complete W2. Similarly, sample I"Q" does not complete word W3 so it will be stored until the final I'''Q''' sample for (A0 C0) is received. This final I'''Q''' sample in turn must be stored to complete word W4 until the first IQ sample for antenna carrier group (A0 C1) is received.

The mapping of the IQ samples continues as shown in FIG. 1. This type of mapping protocol can be performed by suitable conventional mapping circuits of the prior art. But note that conventional mapping circuits cannot accommodate multiple mapping protocols because both the IQ sample size and the CPRI basic frame word length may change from protocol to protocol. In contrast, a mapping circuit according to the present invention advantageously does not need any hardware reconfiguration to accommodate such widely different CPRI basic frame mappings.

FIG. 2 shows an embodiment as a mapping circuit 200 for mapping IQ samples into CPRI basic frames. Mapping circuit 200 includes a current IQ sample register 205 that registers the current IQ sample according to a CPRI word rate clock 210. Current IQ sample register 205 begins a shift register chain 204, which ends at an mth IQ delay sample register 225. At each cycle of clock 210, the contents of a given register in shift register chain 204 is shifted to the subsequent register as known in the shift register arts. For example, the contents of register 205 shift to a first IQ delay sample register 215 at each cycle of CPRI word rate clock 210. The width of each register in chain 204 is selected so as to accommodate the largest expected IQ sample size. This selection is also driven by cost and resource issues. For example, it may be that mapping circuit 200 is designed to map no larger than 40-bit IQ samples into a CPRI basic frame. Thus, each register in shift register chain 204 would be 40-bits wide. No hardware changes are thus needed to accommodate smaller IQ samples in such a configuration in that a 40-bit wide register can register smaller words such as the 30-bit IQ samples discussed previously. In such a case, the unused bit positions in registers 205 through 225 would simply store "don't care" values. For example, if a 40-bit-wide register 205 is storing a 30-bit IQ sample, then the ten most significant bits stored by the register would be don't care values. However, if a 40-bit-wide register 205 is storing a 40-bit IQ sample, these corresponding ten most significant bits would be IQ data. In this fashion, shift register chain 204 can readily accommodate different IQ sample sizes.

Depending upon the CPRI word size as compared to the IQ sample size, the actual number of registers used in shift register chain 204 will differ for any given mapping. For example, as discussed further, registers 205 and 215 are sufficient to map 30-bit IQ samples into IQ data block 100 described previously. All the remaining registers in shift register 204 would thus be storing don't care values for such a mapping. However, other mappings may require additional delayed IQ sample cycles. In chain 204, there are an arbitrary integer number m of these delayed IQ sample registers. Thus, suppose a first IQ sample is registered in current IQ sample register 205 at an ith cycle of CPRI word rate clock 210. After shifting through the intervening delayed IQ sample registers (which are not illustrated for clarity), mth IQ delay sample register 225 will register this IQ sample at the (i+m)th cycle of clock 210. In general, the number of registers in chain 204 is driven by the maximum number of cycles for clock 210 for which any given IQ sample must be stored in chain 204. The following discussion will assume that only three registers are necessary in chain 204 but it will be appreciated that the chain length will depend upon the mappings one desires mapping circuit 200 to accommodate. In a 3-register chain 204, register 225 is the third and final register.

To consecutively form the CPRI basic frame words W1 through W15 responsive to cycles of CPRI word rate clock 210, a CPRI word register 220 receives the appropriate bits from the shift register chain 204 as stored in registers 205 and the delayed sample registers such as registers 215 and 225. A multiplexer associates with each bit position in CPRI word register 220 to select the appropriate bit from the IQ sample registers 210 through 225. For example, a first multiplexer 230 is configured to select from the registers in chain 204 to provide the input bit for registration in the least significant bit position in CPRI word register 220. Other multiplexers are similarly associated with the remaining bit positions such that an nth multiplexer 235 provides the input bit for the most significant bit position in CPRI word register 220. Each multiplexer functions as an N:1 multiplexer, where N is an integer determined by the number of registers in chain 204 and the width of each of these registers in chain 204. For example, suppose mapping circuit 200 is designed for mappings that permit chain 204 to include just three registers—in such a case, register 225 would be the third and final register in chain 204. If the maximum IQ sample size is limited to 40 bits, N becomes (3*40) such that each multiplexer 230 through 235 would be a 120:1 multiplexer. Similarly, the width n of CPRI word register 220 depends upon the CPRI line rate: CPRI words are 16 bits long for a 1.2 GHz line rate, 32 bits long for a 2.4 GHz line rate, and 40 bits long for a 3 GHz line rate. Thus, the width n of CPRI word register 220 depends upon the maximum expected CPRI line rate for all the mappings that will be accommodated by mapping circuit 200. If the actual CPRI line rate is less then this maximum line rate (for example, if register 220 is 32 bits wide but the particular mapping being implemented uses a CPRI word length of 16 bits), the unused bit positions in register 220 will thus also store don't care values. Alternatively, CPRI word register 220 may be instantiated only for a certain CPRI word length. Similarly, mapping circuit 200 may be configured with only the sample registers necessary for a particular mapping.

The components for mapping circuit 200 such as shift register chain 204, multiplexers 230 through 235, and register 220 are all well-known components in the circuit arts. Thus, a mapping circuit 200 may be formed using discrete electronic components to implement these various components. Alternatively, these components may all be integrated within an integrated circuit containing mapping circuit 200. Similarly, these components may be formed by appropriate configuration of a programmable logic device (PLD).

It will be appreciated that virtually any PLD such as a field programmable logic device (FPGA) or a complex programmable gate array (CPLD) will have the logic resources that may be configured to form the registers and multiplexers of mapping circuit 200. For example, the configuration of FPGA logic resources such as lookup tables (LUTs) into multiplexers is well known in the programmable logic device arts. In addition, an ample number of registers are typically provided on a programmable logic device to form shift register chain 204 and register 220.

Operation of mapping circuit 200 may be further explained as follows with respect to the mapping into IQ data block 100. Because the mapping for IQ data block 100 only requires two sample registers (current sample register 205 and IQ delay sample register 215) within chain 204, any remaining registers in chain 204 will store don't care values for such a mapping. If the maximum line rate achievable for mapping circuit 200 is such that CPRI word register 220 is 32-bits wide, there are 32 corresponding multiplexers in the set ranging from multiplexer 230 to 235. As discussed above, an initial IQ sample for data block 100 is insufficient to construct word W1 such that it must be registered in current sample register 205. At the next cycle of clock 210, this initial IQ sample (bits I0 through Q14 as well as any don't care values depending upon the width of each register in chain 204) is shifted to register 215 while current sample register 205 registers the subsequent IQ sample (bits I'0 through Q'14 plus any don't care values). At this point there are enough IQ sample bits to complete W1 in data block 100. The selection performed by each multiplexer such as multiplexer 230 and multiplexer 235 to provide the corresponding input bit for CPRI word register 220 varies from CPRI word to CPRI word across IQ data block 100. For example, first multiplexer 230, which selects for the least significant bit position in CPRI word register 220, would be configured to select for the zeroth (least significant) bit I0 in register 215 for the mapping into word W1. To complete word W1, a second multiplexer 240 that selects for the next-to-least significant bit in register 210 would be configured to select for next-to-least significant bit Q1 in register 215 and so on such that a thirtieth multiplexer (not illustrated) selects most significant bit Q14 from register 215 to fill the thirtieth bit position in word W1. The remaining two bits in word W1 are selected from current sample register 205. For example, multiplexer 235 selects bit Q'0 from the next-to-least-significant bit position in current sample register 205 to complete word W1. Further examination of IQ data block 100 shows that analogous but different multiplexer configurations are required to produce words W2 through W15.

The selection by each multiplexer is driven by address signals such as address bits stored in a memory 250. The necessary number of address bits for each N:1 multiplexer depends upon the length for chain 204 and the width for each register in chain 204. If N is 120 as discussed above, each multiplexer requires up to seven address bits to achieve its selection. If the maximum line rate is such that CPRI word register 220 is 32 bits wide, then 7*132=896 bits are required for the selection of any given CPRI word from W=1 to W=15 by register 220. The corresponding address bits for any given CPRI word may be designated as a control word. The control words are repeated frame to frame such that memory 250 need only store fifteen of these control words. For example, a first control word 265 in memory 250 provides the address bits for the multiplexers as necessary for word W1, a second control word 266 corresponds to word W2, and so on such that a fifteenth control word (not illustrated) in memory 250 corresponds to word W15. The type of memory 240 may vary as varied as desired for a given embodiment, for example, it may comprise an embedded RAM such as SRAM or DRAM, FLASH, or it may comprise an external memory. Memory 250 may thus comprise any type of writeable memory to allow the in-system reconfiguration of mapping circuit 200 so as to accommodate the various desired mappings for circuit 200. Should mapping circuit 200 be implemented through appropriate configuration of a PLD, memory 250 may comprise the PLD's configuration memory, or even an external memory. A simple controller (not illustrated) such as a state machine as constructed from appropriately-configured logic resources in the PLD need merely sequentially retrieve the desired control words responsive to cycles of clock 210 to provide the address bits to the multiplexers. In that regard, it may be seen that such a controller is effectively a modulo 15 counter, cycling from 1 to 15 again and again to select the appropriate control words although it must be noted that every 16$^{th}$ clock cycle corresponds to the CPRI basic frame control word (W=0) such that the controller should be configured to skip over the control word clock cycles.

Figure 3B:
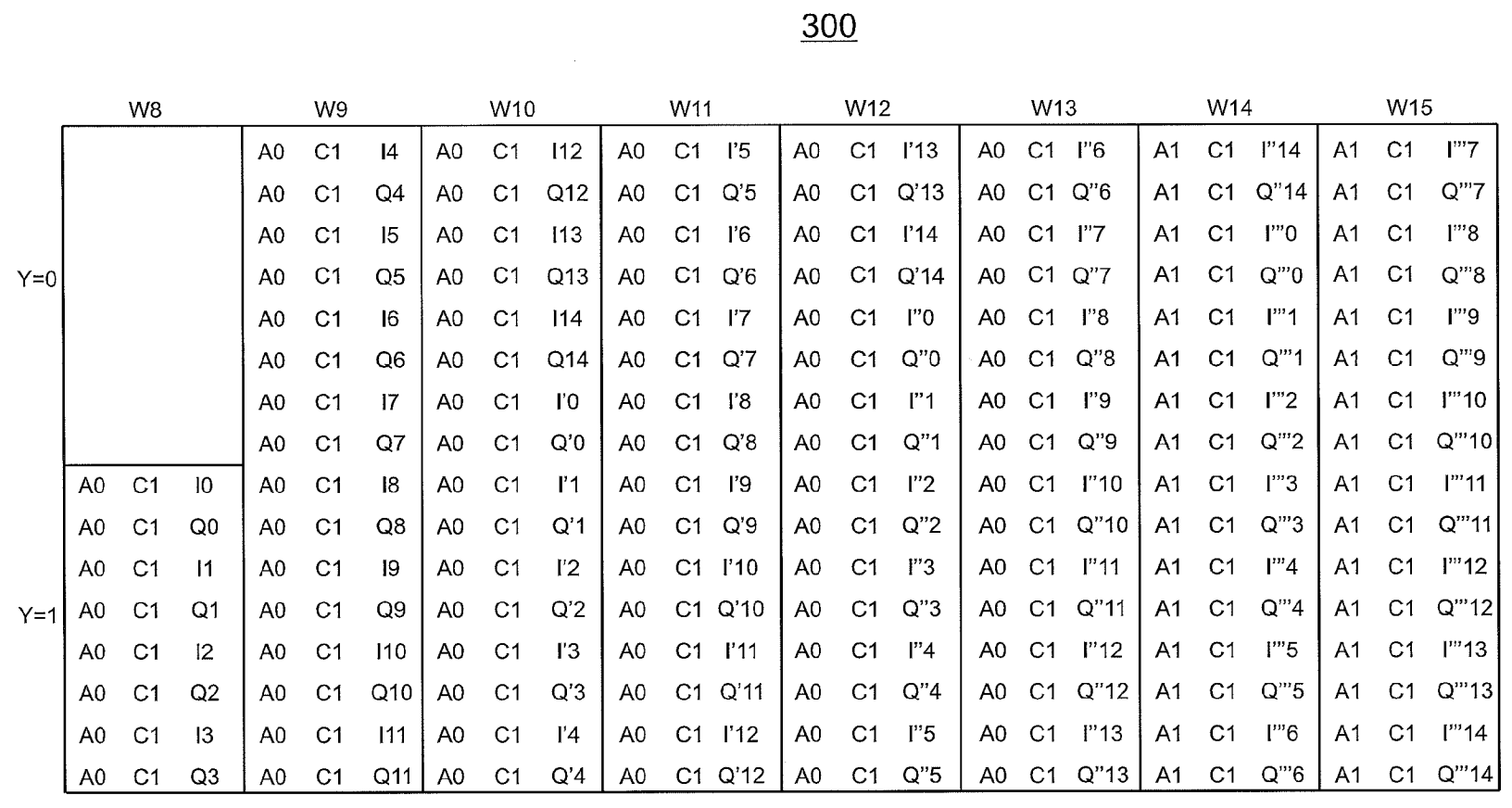

It may thus be observed that mapping circuit 200 is quite flexible in that one need only re-program the control words in memory 250 to accommodate different CPRI basic frame mappings. Any given programming corresponds to a particular mapping that is currently desired. For example, FIG. 3 illustrates a 1.2 GHz line rate CPRI basic frame IQ data block 300 for an LTE mapping of two antenna carrier groups (A0 C0) and (A0 C1) having a bandwidth of 10 MHz. Because the CPRI word length is just 16 bits for such a line rate, the sixteen most significant bits stored in CPRI word register 220 will be don't care values. Similarly, the address signals for the corresponding registers for these bits would be don't care values as well. To perform the mapping into IQ data block 300, chain 204 requires three registers such that register 225 is the third sample register after register 215 in shift register chain 204 so that register 225 stores a twice-delayed version of the IQ samples. The necessity for a chain of 3 sample registers to map block 300 as compared to using just the two registers 205 and 215 to map block 100 arises from the structure of block 300. For example, it may be observed that the second IQ sample (bits I'0 to Q'14) for (A0 C0) wraps from word W2 to word W4. Thus, the second IQ sample must be registered for 3 consecutive clock cycles (corresponding to the clock cycles timing words W2, W3, and W4) so as to shift from register 205 to 215 and then from register 215 to register 225 before it is no longer needed. Referring again to block 100, it is conceivable that for certain alternative mappings of 30-bit samples into 32-bit CPRI words that a chain of three IQ sample registers would also be required. Such a situation would arise in block 100 with respect to an ith cycle of clock 210 if a CPRI basic frame data word started with the final bit from the IQ sample corresponding to the (i−2)th clock cycle because this basic frame word would then continue with the thirty bits from the (i−1)th IQ sample and finish with the initial bit from the current (ith) IQ sample.

It will be appreciated that although mapping circuit 200 has been described with respect to the mapping of IQ data samples into a CPRI basic frame data block, mapping circuit 200 may be used for the generic mapping of input words of a first length into a frame of output words of a second length, wherein the first length is different from the second length. In that regard, sample registers 205 through 225 need not store IQ samples from a CPRI RE source but instead can store incoming input words of any arbitrary protocol that must be mapped into a frame of output words. Clearly, the length of the input and output words must be different or there is no mapping differences as discussed with respect to blocks 100 and 300. If the input words are considered to have length of n bits, then each sample register 205 through 225 of mapping circuit 200 will be n bits wide. Similarly, if the length of the output words is x bits (x not equal to n), the width of register 220 in mapping circuit 200 would be x bits. As discussed above the length m of shift register chain 204 depends upon the maximum IQ delay demands for any given mapping that is to be accommodated. The number of words in the frame then determines the corresponding number of control words to be stored in memory 250.

Figure 4:
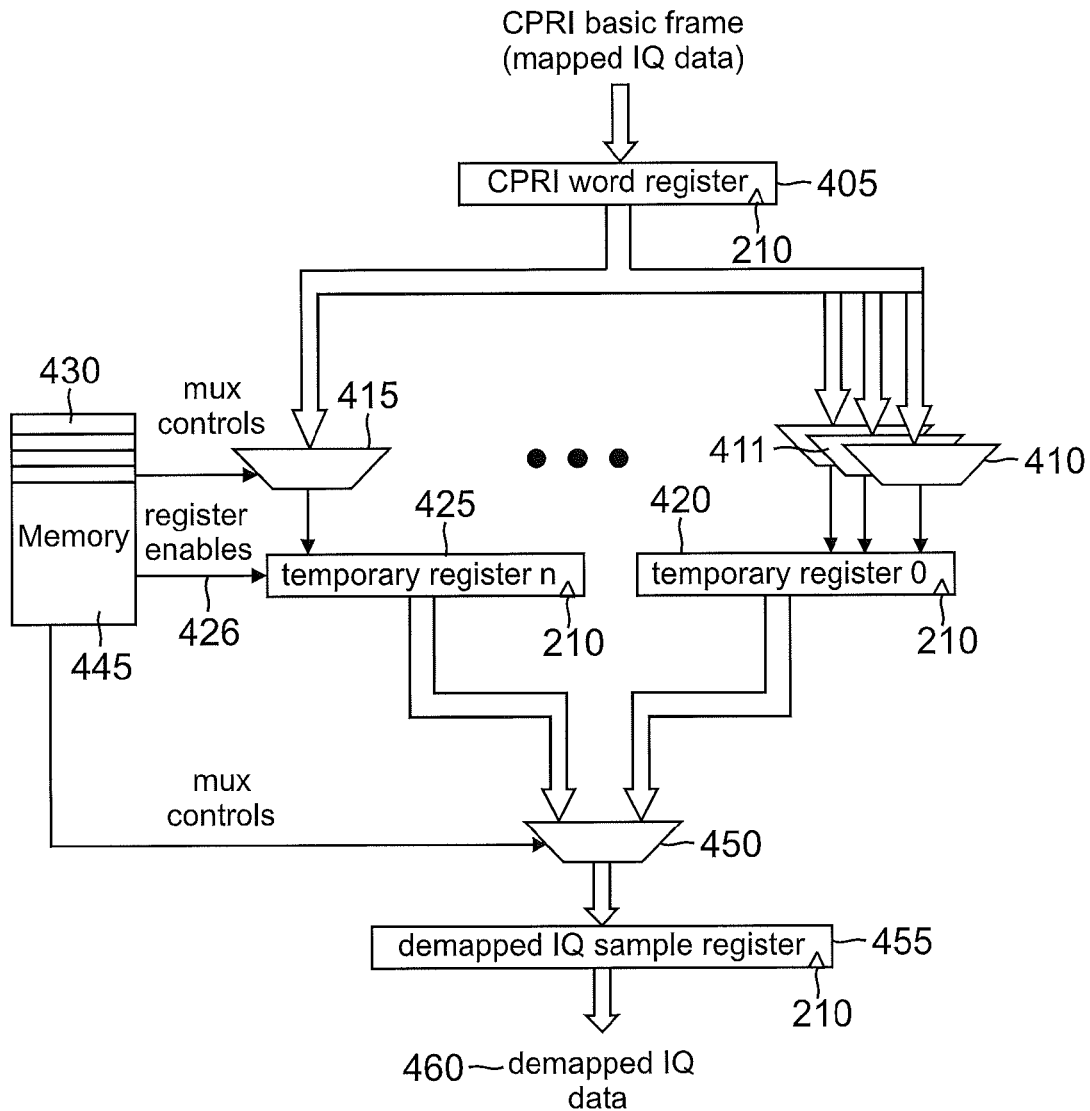
FIG. 4 illustrates a de-mapping circuit configured to de-map CPRI basic frame data blocks into IQ samples.

A de-mapping is performed analogously as described with regard to mapping in that the de-mapping may also be performed through multiplexers controlled by address bits stored in a memory such that by re-programming the memory with new address bits, a new de-mapping is provided. For example, a de-mapping circuit 400 is illustrated in FIG. 4. To de-map a CPRI basic frame data block, a register 405 registers sequential CPRI words from a current data block responsive to cycles of CPRI word rate clock 210. An array of multiplexers arranged from a first multiplexer 410 to a final multiplexer 415 select bits from a current CPRI word in register 405 for registration in a plurality of temporary registers arranged from a first temporary register 420 to an nth temporary register 425. Generally, each of these multiplexers are W:1 multiplexers where W is the maximum word length of the CPRI basic frame words as determined by the maximum line rate that can be accommodated by de-mapping circuit 400. This is a design variable akin to the same maximum line rate choice for mapping circuit 200. Similarly, the width for each of the temporary registers 410 through 415 is selected to accommodate the maximum expected IQ sample size. It can be seen that the multiplexers 410 through 415 may be considered as being arranged into sets such that each set corresponds to a particular temporary register.

If the maximum line rate that can be accommodated by de-mapping circuit 400 limits the CPRI word size to be 32 bits and the maximum IQ sample size is 40 bits, multiplexers 410 to 415 are thus 32:1 multiplexers whereas temporary registers 420 through 425 are forty bit registers. As discussed analogously with regard to the shift register chain 204 of FIG. 2, the number n of temporary registers depends upon all the particular CPRI basic frame structures that de-mapping circuit 400 must accommodate. For example, to de-map data block 300 into a first IQ sample for antenna carrier group (A0 C0), temporary register 420 would register the sixteen bits in word W1 (ranging from I0 to Q7). Each bit position in registers 420 through 425 associates with a corresponding multiplexer to select for its input bit. For example, the least significant bit position in temporary register 420 stores a bit selected by first multiplexer 410, the next-to-least significant bit position stores a bit selected by a second multiplexer 411 and so on. With respect to initial word W1 in block 300 that corresponds to the first sixteen bits in the initial IQ sample for antenna carrier group (A0 C0), first multiplexer 410 through a sixteenth multiplexer (not illustrated for clarity) will select for all sixteen bits in this word. First multiplexer 410 may be configured through address bits from, for example, a control word 430 stored in a memory 445 to select for bit I0 in word W1. Second multiplexer 411 is thus configured by address bits in control word 430 to select for bit Q0 in word W1, and so on such that the sixteenth multiplexer selects for final bit Q7 in word W1. But such a de-mapping leaves the most significant bit positions in temporary register 420 unfilled (bit positions seventeen through thirty for the thirty-bit IQ samples of block 300). Word W2 is registered in CPRI word register 405 at the subsequent cycle of clock 210 whereupon these unfilled bit positions in register 420 are selected for through the appropriate multiplexers in the corresponding set of multiplexers. In this case, the multiplexers would correspond to a seventeenth multiplexer to a thirtieth multiplexer (not illustrated for clarity) for this set. Thus, when word W2 of block 300 is registered in register 405 at this next cycle of clock 210, the seventeenth multiplexer selects for bit I8, the eighteenth multiplexer selects for bit Q8, and so on such that the thirtieth multiplexer selects for bit Q14. If each register 420 through register 425 is 40-bits wide, the final 10 most significant bits in register 420 are thus storing don't care values. At the same time, the remaining two bits in word W2, bits I' and Q'0 from the subsequent IQ sample are registered in corresponding positions in temporary register 425. With the initial 30-bit IQ sample thus stored in temporary register 420, a multiplexer 450 may then select for the contents of temporary register 425 to provide the initial IQ sample for antenna carrier group (A0 C0) to a de-mapped IQ sample register 455, which then provides de-mapped IQ data 460. In general, multiplexer 450 will have an output width that matches the maximum-size IQ sample that will be accommodated by de-mapping circuit 400. Similarly, its input width will be determined by required number of temporary register and their width. It may be seen that only two temporary registers are necessary to complete the de-mapping of many mappings such as that for blocks 300 and 100 but in general the number n of such temporary registers will depend upon all the mappings that de-mapping circuit 400 must accommodate. If the relationship between the CPRI word size and the IQ sample size is such that bits from a maximum number of two IQ samples will be used in any given CPRI word, then two temporary register is all that is necessary. However, if a mapping is such that bits from three IQ samples are used in any given CPRI word, then three temporary register are necessary, and so on. Given this maximum number n of temporary registers and a maximum IQ sample size of X bits, multiplexer 450 is thus an X*n:X multiplexer.

To complete the subsequent I'Q' sample for antenna carrier group (A0 C0), temporary register 425 will subsequently store all bits in word W3 at the next clock 210 cycle. Register 425 will then store the first twelve bits (I'9 through Q'14) of word W4 when this word is registered in CPRI word register 405 at the subsequent clock 210 cycle through appropriate multiplexer configuration as controlled by a corresponding control word in memory 445. Memory 445 may be the same as memory 250 (assuming the same device performs the mapping and de-mapping) or may be a separate memory. As discussed with regard to memory 250, the type of memory used to implement memory 445 is not important such that memory 445 may comprise any writeable memory such as an embedded SRAM, DRAM, FLASH, or even an external memory. With register 425 storing the subsequent I'Q' sample as discussed above, multiplexer 450 may select for the contents of register 425 to fill de-mapped IQ sample register 455.

It may be seen that a different control word may be retrieved from memory 445 responsive to each cycle of clock 210 to control multiplexers 410 through 450 analogously as discussed with regard to device 200 of FIG. 2. But there is additional control desirable with regard to temporary registers 420 though 425 because these registers store partial word contents over successive clock cycles. For example, as discussed above with respect to words W1 and W2 in data block 300, temporary register 420 stores its first sixteen bits responsive to the registration of word W1 but then stores its seventeenth bits through thirtieth bits responsive to the registration of word W2. Thus, when this last portion of the IQ sample is registered, the already-registered portion of the IQ sample stored as the first sixteen bits in register 420 should be protected from an over-write while the last portion of the IQ sample is registered. Thus, each bit position in temporary registers 420 through 425 may be write enabled in response to corresponding write enable signals 426 provided by memory 445 or an other suitable memory. The write enable signal for a given bit position in these registers is not enabled during a cycle in which the stored bit is to be protected from overwrite. Although all the write enable signals may be stored in a separate memory, it is convenient to concatenate the necessary enable signals with the address bits in combined control words in memory 445 such that a controller may sequentially call the control words such as a word 430 to configure multiplexers 410 through 450 and registers 420 through 425 according to a given clock cycle.

The de-mapping for block 300 would continue analogously as discussed above. Each temporary register may be re-used once its contents have been selected for by multiplexer 450 for registration by de-mapped IQ sample register 455. For example, after temporary register 420 has stored the first IQ sample (upon receipt of word W2), it may be used to store the final four bits of word W4 to begin registration of the third IQ sample through appropriate configuration of the corresponding multiplexers (first multiplexer 410 through the sixteenth multiplexer). As discussed with regard to mapping circuit 200, all the components in de-mapping circuit 400 are well known components that may readily be implemented in an integrated circuit or with discrete circuits by those of ordinary skill in the art. Alternatively, the appropriate configuration of a PLD such as through configuration of logic resources such as LUTs within an FPGA to function as these components is known in the art. Accordingly, a conventional programmable logic device such as an FPGA or a complex gate array device (CPLD) may be configured as mapping circuit 200 or de-mapping circuit 400 (or as both) without any hardware changes necessary.

A comparison of data blocks 100 and 300 shows that memory 445 in de-mapping circuit 400 may readily be reprogrammed with the suitable control words for different mappings. This is quite advantageous as compared to a conventional RTL control of CPRI mapping and de-mapping in programmable logic devices. In such conventional RTL control, the RTL must be re-designed for different mappings that entails considerable cost and complexity. In contrast, circuits 200 and 400 may simply have their control words changed to effect different mappings and de-mappings.

As discussed with regard to mapping circuit 200, de-mapping circuit 400 need not be limited to just the de-mapping of CPRI basic frame data blocks. Instead, de-mapping circuit 400 is readily configured for the de-mapping of frames of input words into output words, where the input words and the output words have different lengths. For example, to accommodate the de-mapping of a frame of input words having a maximum length of x bits into output words having a maximum length of y bits, register 405 would then be x-bits wide. Each multiplexer 410 through 415 would also then be x:1 multiplexers. The remaining registers 420 through 455 would be y-bit registers. As discussed above, the number n of temporary registers depends upon the particular mapping. Having determined n through this mapping, multiplexer 450 is thus a n*y:y multiplexer. A number of words z in the frame (the frame size) would then determine the same number of control words for control of de-mapping circuit 400, where the control words are sequentially retrieved as the input words are registered.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A de-mapping circuit for a de-mapping of input words of a first length into output words of a second length different from the first length, comprising:
   a word register of the first length for successively storing each of the inputs words responsive to cycles of a clock;
   a plurality of temporary registers of the second length for temporarily storing the output words,
   a plurality of sets of first multiplexers corresponding to the plurality of temporary registers, each first multiplexer configured to select a bit from the input words stored in the word register, the sets corresponding to the temporary registers such that the bits selected by each set of first multiplexers are stored by the corresponding temporary register to form the temporarily-stored output words, wherein the selection by the first multiplexers is configured by address signals; and a memory for storing the address signals for the multiplexers.

2. The de-mapping circuit of claim 1, further comprising:

an second multiplexer for selecting from the temporarily-stored output words, wherein the second multiplexer is configured by address signals stored in the memory; and a de-mapped sample register of the second length for storing an output word selected by the second multiplexer.

3. The de-mapping circuit of claim 1, wherein the de-mapping circuit is integrated into an integrated circuit.

4. The de-mapping circuit of claim 1, wherein the de-mapping circuit comprises a programmable logic device (PLD) having logic resources configured to form the multiplexers.

5. A method of de-mapping input words of a first length into output words of a second length different from the first length, comprising:

storing an inputs word into a first register of the first length;

selecting bits from the stored input word and temporarily storing each selected bit into a separate second register of the second length; and repeating the storing and selecting steps until the second registers store each store an output word of the second length, wherein the selecting is performed by a set of first multiplexers responsive to address signals.

6. The method of claim 5 including:

selecting among the output words stored in the second registers; and successively storing the selected output words in a third register, wherein the selecting is performed by a second multiplexer responsive to address signals.

* * * * *

UNITED STATES PATENT AND TRADEMARK OFFICE
CERTIFICATE OF CORRECTION

PATENT NO. : 8,823,561 B1
APPLICATION NO. : 13/452060
DATED : September 2, 2014
INVENTOR(S) : Michael Hammer et al.

Page 1 of 1

It is certified that error appears in the above-identified patent and that said Letters Patent is hereby corrected as shown below:

In the Claims
Col. 12, line 1: Change "inputs words" to --input words--.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO.        : 8,823,561 B1
APPLICATION NO.   : 13/452060
DATED             : September 2, 2014
INVENTOR(S)       : Michael Hammer et al.

It is certified that error appears in the above-identified patent and that said Letters Patent is hereby corrected as shown below:

In the Claims

Col. 10, line 59: Change "inputs words" to --input words--.

Signed and Sealed this
Seventeenth Day of February, 2015

Michelle K. Lee
*Deputy Director of the United States Patent and Trademark Office*